US012136435B2

(12) United States Patent
Masumura et al.

(10) Patent No.: US 12,136,435 B2
(45) Date of Patent: Nov. 5, 2024

(54) UTTERANCE SECTION DETECTION DEVICE, UTTERANCE SECTION DETECTION METHOD, AND PROGRAM

(71) Applicant: NIPPON TELEGRAPH AND TELEPHONE CORPORATION, Tokyo (JP)

(72) Inventors: Ryo Masumura, Tokyo (JP); Takanobu Oba, Tokyo (JP); Kiyoaki Matsui, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 105 days.

(21) Appl. No.: 17/628,045

(22) PCT Filed: Jul. 24, 2019

(86) PCT No.: PCT/JP2019/029035

§ 371 (c)(1),
(2) Date: Jan. 18, 2022

(87) PCT Pub. No.: WO2021/014612

PCT Pub. Date: Jan. 28, 2021

(65) Prior Publication Data

US 2022/0270637 A1 Aug. 25, 2022

(51) Int. Cl.
*G10L 25/78* (2013.01)
*G10L 25/93* (2013.01)

(52) U.S. Cl.
CPC .............. *G10L 25/78* (2013.01); *G10L 25/93* (2013.01); *G10L 2025/783* (2013.01)

(58) Field of Classification Search
CPC .... G10L 25/78; G10L 25/93; G10L 2025/783
See application file for complete search history.

(56) References Cited

U.S. PATENT DOCUMENTS 7,805,304 B2 9/2010 Washio
9,437,186 B1 * 9/2016 Liu ........................ G10L 15/22

FOREIGN PATENT DOCUMENTS

JP 200517932 A 1/2005
JP 2007256482 A 10/2007

OTHER PUBLICATIONS

Tong et al. (2016) "A comparative study of robustness of deep learning approaches for VAD," In Proc. International Conference on Acoustics, Speech, and Signal Processing (ICASSP), pp. 5695-5699.

* cited by examiner

*Primary Examiner* — Thomas H Maung

(57) ABSTRACT

An utterance section detection device which is capable of detecting an utterance section with high accuracy on the basis of whether or not an end of a speech section is an end of utterance. The utterance section detection device includes a speech/non-speech determination unit configured to perform speech/non-speech determination which is determination as to whether a certain frame of an acoustic signal is speech or non-speech, an utterance end determination unit configured to perform utterance end determination which is determination as to whether or not an end of a speech section is an end of utterance for each speech section which is a section determined as speech as a result of the speech/non-speech determination, a non-speech section duration threshold determination unit configured to determine a threshold regarding a duration of a non-speech section on the basis of a result of the utterance end determination, and an utterance section detection unit configured to detect an utterance section by comparing a duration of a non-speech section following the speech section with the corresponding threshold.

8 Claims, 4 Drawing Sheets

UTTERANCE SECTION DETECTION DEVICE, UTTERANCE SECTION DETECTION METHOD, AND PROGRAM

CROSS-REFERENCE TO RELATED APPLICATIONS

This application is a U.S. National Stage Application filed under 35 U.S.C. § 371 claiming priority to International Patent Application No. PCT/JP2019/029035, filed on 24 Jul. 2019, the disclosure of which is hereby incorporated herein by reference in its entirety.

TECHNICAL FIELD

The present invention relates to detection of an utterance section of an acoustic signal, and relates to an utterance section detection device, an utterance section detection method, and a program.

BACKGROUND ART

Detection of an utterance section plays an important role in speech application such as speech recognition, speaker recognition, language identification and speech dialogue. For example, in speech dialogue, natural interaction between a user and a system can be achieved by performing speech recognition on speech of the user for each utterance section and making a response for each utterance section in accordance with a speech recognition result. An important point which should be taken into account to achieve detection of an utterance section is to robustly cut out a correct utterance section from an input acoustic signal. In other words, it is important to detect an utterance section while preventing original utterance from being interrupted or preventing extra non-speech sections from being excessively included.

In related art, an utterance section is detected using a technology called speech/non-speech determination and post-processing using a threshold with respect to a duration of a non-speech section.

Speech/non-speech determination is a technology for accurately determining a speech section and a non-speech section of an acoustic signal. Speech/non-speech determination typically employs a structure of determining a binary of speech and non-speech for each short time frame (for example, 20 msec) of an acoustic signal. The simplest method is a method of performing speech/non-speech determination by calculating speech power for each short time frame and determining whether the speech power is greater or smaller than a threshold determined by a human in advance. Many methods for speech/non-speech determination based on machine learning have been studied as further constructive methods. In a case of speech/non-speech determination based on machine learning, speech/non-speech determination is performed using an identifier which extracts a Mel-frequency cepstral coefficient or a basic frequency acoustic characteristic amount for each short time frame and outputs a label indicating speech or non-speech from the information. For example, a method based on machine learning is disclosed in Non-Patent Literature 1.

Subsequently, post-processing using a threshold with respect to a duration of a non-speech section will be described. In the post-processing, processing is performed on a label sequence indicating speech or non-speech which is output information after speech/non-speech determination is performed. In the post-processing, a threshold σ for a duration of a non-speech section provided by a human in advance is used to regard a non-speech section having a time length less than the threshold σ as a "non-speech section within an utterance section" and regard a non-speech section having a time length equal to or greater than the threshold σ as a "non-speech section outside an utterance section", so as to regard a "speech section" and a "non-speech section within an utterance section" as an utterance section. Detection of an utterance section using this method is disclosed in, for example, Non-Patent Literature 1.

CITATION LIST

Non-Patent Literature

Non-Patent Literature 1: S. Tong, H. Gu, and K. Yu, "A comparative study of robustness of deep learning approaches for VAD," In Proc. International Conference on Acoustics, Speech, and Signal Processing (ICASSP), pp. 5695-5699, 2016.

SUMMARY OF THE INVENTION

Technical Problem

In related art, a fixed threshold is provided for the duration of a non-speech section as post-processing after speech/non-speech determination, and whether or not a speech section immediately before a non-speech section is an end of utterance is not taken into account. Thus, there is a case where an utterance section cannot be successfully detected particularly when a huge variety of speech phenomena such as spoken language are handled. For example, if an end of a certain speech section is hesitation such as "er", this end is highly likely to be not an end of utterance, and a non-speech section following this is considered to be a "non-speech section within an utterance section". Meanwhile, if an end of a certain speech section is post positional particle expression such as "desu" and "masu" [post positional particle], this end is highly likely to be an end of utterance, and a non-speech section following this is considered to be a "non-speech section outside an utterance section". In related art, a fixed threshold is used for a duration of a non-speech section without taking into account whether or not an end of a speech section immediately before a non-speech section is an end of utterance, and thus, there is a case where expected operation cannot be implemented. For example, if a threshold σ is set at a longish period such as 2.0 seconds, while it is possible to prevent an utterance section being interrupted in the middle of utterance to a certain degree, there is a case where excess non-speech sections are excessively included within the utterance section. Meanwhile, if the threshold σ is set at a shortish period such as 0.2 seconds, while it is possible to somewhat prevent excess non-speech sections from being excessively included within an utterance section, there is a case where the utterance section is interrupted in the middle of utterance.

It is therefore an object of the present invention to provide an utterance section detection device which is capable of detecting an utterance section with high accuracy on the basis of whether or not an end of a speech section is an end of utterance.

Means for Solving the Problem

A speech/non-speech determination device of the present invention includes a speech/non-speech determination unit, an utterance end determination unit, a non-speech section duration threshold determination unit, and an utterance section detection unit.

The speech/non-speech determination unit performs speech/non-speech determination which is determination as to whether a certain frame of an acoustic signal is speech or non-speech. The utterance end determination unit performs utterance end determination which is determination as to whether or not an end of a speech section is an end of utterance for each speech section which is a section determined as speech as a result of the speech/non-speech determination. The non-speech section duration threshold determination unit determines a threshold regarding a duration of a non-speech section on the basis of a result of the utterance end determination. The utterance section detection unit detects an utterance section by comparing a duration of a non-speech section following the speech section with the corresponding threshold.

Effects of the Invention

According to a speech/non-speech determination device of the present invention, it is possible to detect an utterance section with high accuracy on the basis of whether or not an end of a speech section is an end of utterance.

DESCRIPTION OF EMBODIMENT

Figure 1:
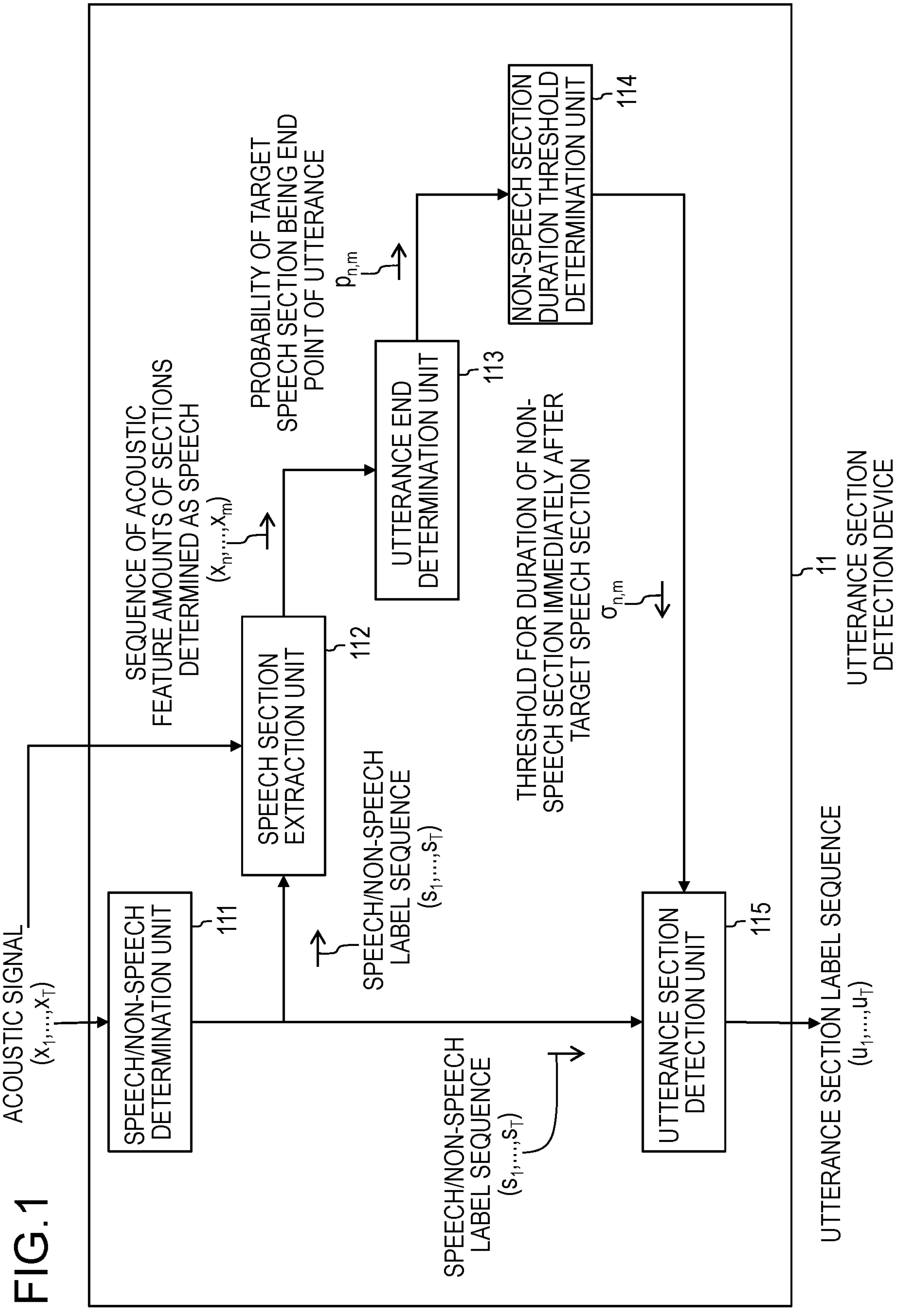
FIG. 1 is a block diagram illustrating a configuration of an utterance section detection device in Embodiment 1.

An embodiment of the present invention will be described in detail below. Note that the same reference numerals will be assigned to components having the same functions, and repetitive description will be omitted. Embodiment 1

<Configuration and operation of utterance section detection device 11>

A configuration of an utterance section detection device of Embodiment 1 will be described below with reference to FIG. 1. As illustrated in FIG. 1, an utterance section detection device 11 of the present embodiment includes a speech/non-speech determination unit 111, a speech section extraction unit 112, an utterance end determination unit 113, a non-speech section duration threshold determination unit 114, and an utterance section detection unit 115.

Figure 2:
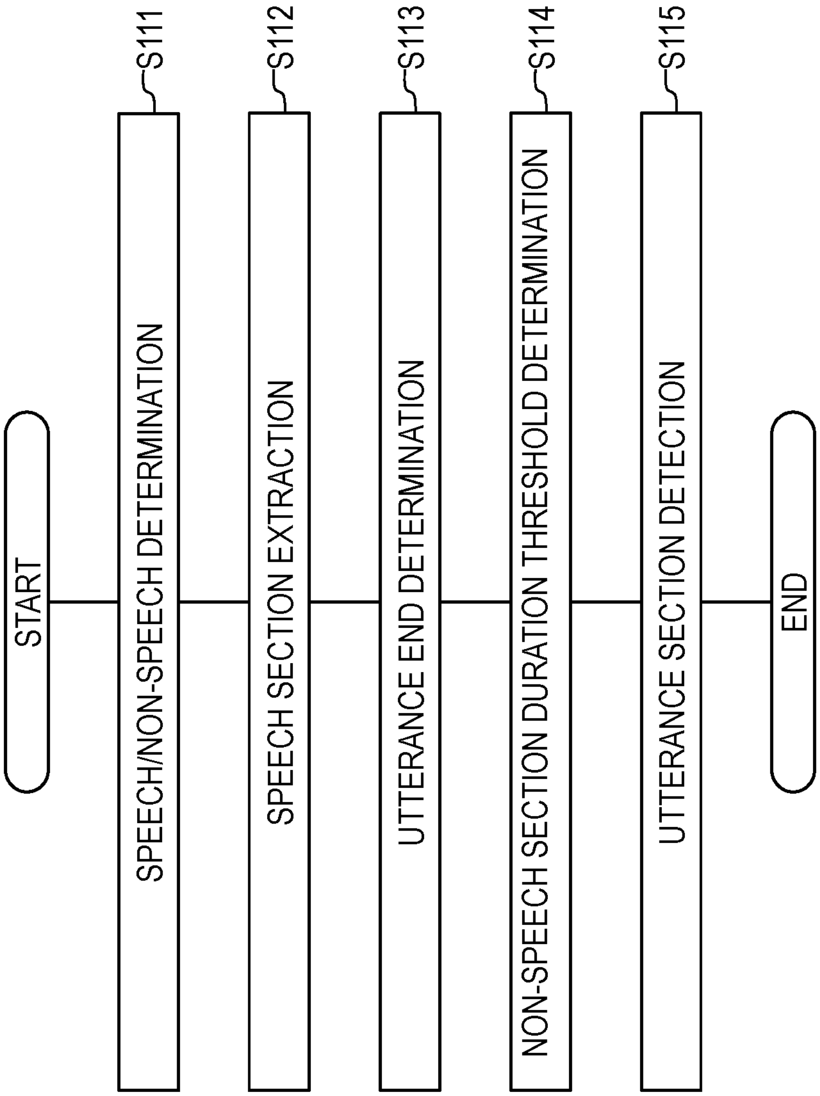
FIG. 2 is a flowchart illustrating operation of the utterance section detection device in Embodiment 1.

Operation of the respective components will be described below with reference to FIG. 2.

The speech/non-speech determination unit 111 performs speech/non-speech determination which is determination as to whether a certain frame of an acoustic signal is speech or non-speech (S111). The speech section extraction unit 112 extracts a speech section which is a section determined as speech as a result of the speech/non-speech determination (S112). The utterance end determination unit 113 performs utterance end determination which is determination as to whether or not an end of a speech section is an end of utterance for each speech section (S113). The non-speech section duration threshold determination unit 114 determines a threshold regarding a duration of a non-speech section on the basis of a result of the utterance end determination (S114). The utterance section detection unit 115 detects an utterance section by comparing a duration of a non-speech section following a speech section with a corresponding threshold (S115). In this event, the non-speech section duration threshold determination unit 114 makes the corresponding threshold smaller as a probability of an end of a speech section being an end of utterance is higher and makes the corresponding threshold greater as a probability of an end of a speech section being an end of utterance is lower. The utterance section detection unit 115 detects a non-speech section corresponding to a case where a duration of a non-speech section following a speech section is equal to or greater than a threshold as a non-speech section outside an utterance section. Further, the utterance section detection unit 115 detects a non-speech section corresponding to a case where a duration of a non-speech section following a speech section is less than the threshold as a non-speech section within an utterance section.

In other words, if the end of the speech section is hesitation such as "er", it is determined that the end of the speech section is less likely to be an end of utterance on the basis of the utterance end determination in step S113, and a longish threshold (for example, 2.0 seconds) is provided for a duration of a non-speech section in step S114. Meanwhile, if an end portion of an immediately preceding speech section is post positional particle expression such as "desu" and "masu" [post positional particle], it is determined that the corresponding end of the speech section is highly likely to be an end of utterance on the basis of the utterance end determination in step S113, and a shortish threshold (for example, 0.2 seconds) is provided for a duration of a non-speech section in step S114.

Operation of the respective components will be described in further detail below.

<Speech/non-speech determination unit 111>

Input: a sequence of acoustic feature amounts for each short time frame $(x_1, \ldots, x_T)$ Output: a speech/non-speech label sequence $(s_1, \ldots, s_T)$ An acoustic signal which is expressed with a sequence of acoustic feature amounts for each short time frame is input to the speech/non-speech determination unit 111. While various kinds of information can be utilized as the acoustic feature amounts, for example, information such as a Mel-frequency cepstral coefficient and a basic frequency can be used. These are publicly known, and thus, will be omitted here. Here, an input acoustic signal is expressed as $(x_1, \ldots, x_T)$, and $x_t$ indicates an acoustic feature amount of a t-th frame. A speech/non-speech label sequence $(s_1, \ldots, s_T)$ which correspond to $(x_1, \ldots, x_T)$ is output, and $s_t$ indicates a state of a t-th frame and has a label of either "speech" or "non-speech". Here, T is the number of frames included in the acoustic signal.

Any method which satisfies the above-described conditions can be used as a method for converting a sequence of acoustic feature amounts for each short time frame into a speech/non-speech label sequence. For example, in determination using a deep neural network disclosed in Reference Non-Patent Literature 1 and Reference Non-Patent Literature 2, speech/non-speech determination is implemented by modeling a generation probability of a speech/non-speech label of each frame. A generation probability of a speech/non-speech label of a t-th frame can be defined with the following expression. $P(s_t)=\mathrm{VoiceActivityDetection}(x_1, \ldots, x_t;\theta_1)$ Here, VoiceActivityDetection ( ) is a function for performing speech/non-speech determination and can employ an arbitrary network structure if a generation probability of a speech/non-speech label can be obtained as output. For example, a network which obtains a generation probability of a state can be constituted by combining a recurrent neural network, a convolutional neural network, or the like, with a softmax layer. $\theta_1$ is a parameter obtained through learning using training data provided in advance and depends on definition of the function of VoiceActivityDetection ( ). In a case where such modeling is performed, speech/non-speech determination is based on the following expression.

$$\hat{s}_1, \ldots, \hat{s}_T = \underset{s_1, \ldots, s_T}{\operatorname{argmax}} \prod_{t=1}^{T} P(s_t) \quad \text{[Math. 1]}$$

Here, $s\hat{}_1, \ldots, s\hat{}_T$ are speech/non-speech states of prediction results.

Note that it is also possible to use a method using Gaussian mixture distribution disclosed in, for example, Reference Non-Patent Literature 3 as methods other than the above-described methods.

(Reference Non-Patent Literature 1: X.-L. Zhang and J. Wu, "Deep belief networks based voice activity detection," IEEE Transactions on Audio, Speech, an d Language Processing, vol. 21, no. 4, pp. 697-710, 2013.)

(Reference Non-Patent Literature 2: N. Ryant, M. Liberman, and J. Yuan, "Speech activity detection on youtube using deep neural networks," In Proc. Annual Conference of the International Speech Communication Association (INTERSPEECH), pp. 728-731, 2013.)

(Reference Non-Patent Literature 3: J. Sohn, N. S. Kim, and W. Sung, "A statistical model-based voice activity detection," IEEE Signal Processing Letter s, vol. 6, no. 1, pp.1-3, 1999.)

<Speech section extraction unit 112>

Figure 3:
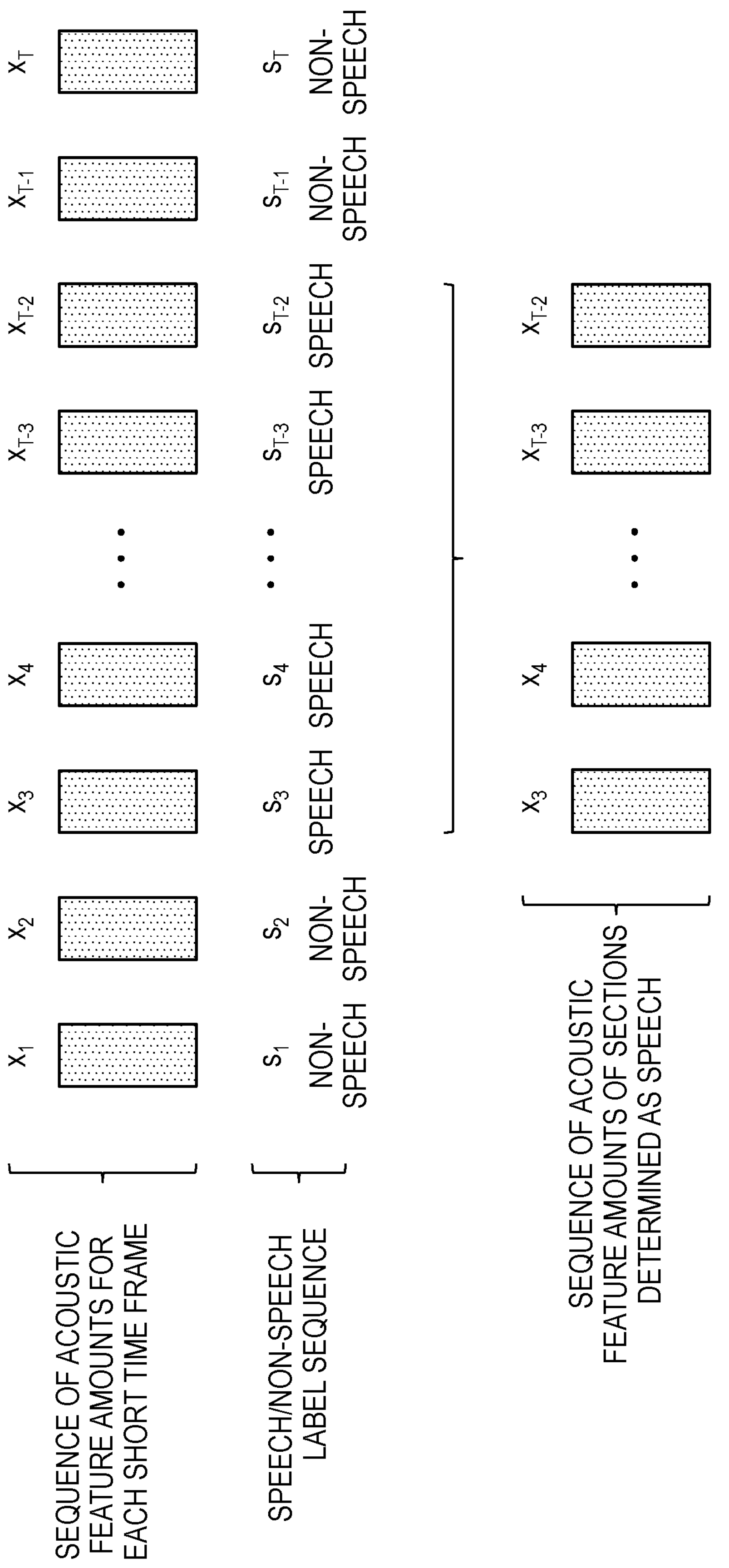
FIG. 3 is a conceptual diagram illustrating an operation example of a speech section extraction unit of the utterance section detection device in Embodiment 1.

Input: a sequence of acoustic feature amounts for each short time frame $(x_1, \ldots, x_T)$, a speech/non-speech label sequence $(s_1, \ldots, s_T)$ Output: a sequence of acoustic feature amounts of a certain section determined as speech $(x_n, \ldots, x_m)$ $(1 \leq n, m \leq T, n < m)$ The speech section extraction unit 112 extracts the sequence of acoustic feature amounts of a certain section determined as speech $(x_n, \ldots, x_m)$ from the sequence of acoustic feature amounts for each short time frame $(x_1, \ldots, x_T)$ on the basis of information regarding the speech/non-speech label sequence $(s_1, \ldots s_T)$ (S112). Note that $1 \leq n$ and $m \leq T$. Here, how many speech sections can be extracted depends on the speech/non-speech label sequence, and if, for example, the label sequence is all determined as "non-speech", no speech section is extracted. As illustrated in FIG. 3, the speech section extraction unit 112 cuts out sections corresponding to sections where speech labels are successive in the speech/non-speech label sequence $(s_1, s_2, \ldots, s_{T-1}, s_T)$. In the example in FIG. 3, $(s_3, \ldots, s_{T-2})$ are speech labels, and others are non-speech labels, and thus, the speech section extraction unit 112 extracts $(x_3, \ldots, x_{T-2})$ as speech sections.

<Utterance end determination unit 113>

Input: a sequence of acoustic feature amounts of a certain section determined as speech $(x_n, \ldots, x_m)$ $(1 \leq n$ and $m \leq T)$ Output: a probability of an end of a target speech section being an end of utterance $p_{n,m}$.

The utterance end determination unit 113 receives input of the sequence of acoustic feature amounts of a certain section determined as speech $(x_n, \ldots, x_m)$ and outputs a probability $p_{n,m}$ of an end of the speech section being an end of utterance (S113). Any processing which outputs a probability $p_{n,m}$ of an end of the target speech section being an end of utterance on the basis of $(x_n, \ldots, x_m)$ may be used as a processing in step S113. For example, the processing in step S113 may be implemented using a method using a neural network described in Reference Non-Patent Literature 4. In this case, a probability of an end of a speech section being an end of utterance can be defined with the following expression.

$$p_{n,m} = \text{EndOfUtterance}(x_n, \ldots, x_m; \theta_2)$$

Here, EndOfUtterance( ) is a function for outputting a probability of an end of an input acoustic feature amount sequence being an end of utterance and can be constituted by combining, for example, a recurrent neural network with a sigmoid function. $\theta_2$ is a parameter obtained through learning using training data provided in advance and depends on definition of the function of EndOfUtterance( ).

Note that while in the present embodiment, only the sequence of acoustic feature amounts of a certain section determined as speech $(x_n, \ldots, x_m)$ is used as information, arbitrary information which has been obtained in the past before the target speech section can be additionally used. For example, information of past speech sections before the target speech section (a sequence of acoustic feature amounts and output information regarding utterance end determination at that time) may be used.

(Reference Non-Patent Literature 4: Ryo Masumura, Taichi Asami, Hirokazu Masataki, Ryo Ishii, Ryuichiro Higashinaka, "Online End-of-Turn Detection from Speech based on Stacked Time-Asynchronous Sequential Networks", In Proc. Annual Conference of the International Speech Communication Association (INTERSPEECH), pp.1661-1665, 2017.)

<Non-speech section duration threshold determination unit 114>

Input: a probability $p_{n,m}$ of a target speech section being an end of utterance Output: a threshold $\sigma_{n,m}$ for a duration of a non-speech section immediately after the target speech section The non-speech section duration threshold determination unit 114 determines the threshold $\sigma_{n,m}$ for the duration of the non-speech section immediately after the target speech section on the basis of the probability $p_{n,m}$ of the target speech section being an end of utterance. A greater input probability $p_{n,m}$ indicates a higher possibility that the end of the target speech section is an end of utterance, and a smaller input probability $p_{n,m}$ indicates a lower possibility that the end of the target speech section is the end of utterance. The threshold for the duration of the non-speech section is determined, for example, as in the following expression by utilizing this property.

$$\sigma_{n,m} = K - k p_{n,m}$$

Here, K and k are hyperparameters determined by a human in advance, and $K \geq k \geq 0.0$. For example, in a case where K=1.0 and k=1.0, if $p_{n,m}$ is 0.9, $\sigma_{n,m}$ becomes 0.1, so that a shortish value can be set as the threshold for a duration of a non-speech section immediately after the target speech section. Meanwhile, if $p_{n,m}$ is 0.1, $\sigma_{n,m}$ becomes 0.9, so that a longish value can be set as the threshold for a duration of a non-speech section immediately after the target speech section.

Note that any method which automatically determines a threshold using a probability of the target speech section being an end of utterance may be used as the threshold determination method in step S114. For example, a fixed value may be set in accordance with a value of $p_{n,m}$. For example, a rule may be set in advance such that if $p_{n,m} \geq 0.5$, $\sigma_{n,m}=0.3$, and if $p_{n,m}<0.5$, $\sigma_{n,m}=1.0$, and the non-speech section duration threshold determination unit 114 may execute threshold determination algorithm based on this rule.

<Utterance section detection unit 115>

Input: a speech/non-speech label sequence $(s_1, \ldots, s_T)$, a threshold $\sigma_{n,m}$ for a duration of a non-speech section immediately after each speech section (0 or more n,m pairs are included)

Output: an utterance section label sequence $(u_1, \ldots, u_T)$

The utterance section detection unit 115 outputs the utterance section label sequence $(u_1, \ldots, u_T)$ using the speech/non-speech label sequence $(s_1, \ldots, s_T)$ and the threshold $\sigma_{n,m}$ for the duration of the non-speech section immediately after each speech section (S115). $(u_1, \ldots, u_T)$ indicates a label sequence expressing utterance sections corresponding to $(s_1, \ldots, s_T)$, and $u_t$ is a binary label indicating that an acoustic signal in a t-th frame is "within an utterance section" or "outside an utterance section". This processing can be implemented as post-processing with respect to $(s_1, \ldots, s_T)$.

Here, provision of a threshold of $\sigma_{n,m}$ means a succession of one or more frames of a non-speech section following a speech/non-speech label $s_{m+1}$ of a (m+1)-th frame. The utterance section detection unit 115 compares a duration of the non-speech section with the threshold $\sigma_m$ and determines the section as a "non-speech section within an utterance section" in a case where the duration of the non-speech section is less than the threshold. Meanwhile, in a case where the duration of the non-speech section is equal to or greater than the threshold, the utterance section detection unit 115 determines the section as a "non-speech section outside an utterance section" (S115). The utterance section detection unit 115 determines an utterance section label sequence $(u_1, \ldots, u_T)$ by implementing this processing for each threshold of the duration of the non-speech section immediately after each speech section. In other words, the utterance section detection unit 115 provides a label of "within an utterance section" to frames of the "non-speech section within an utterance section" and the "speech section" and provides a label of "outside an utterance section" to frames of the "non-speech section outside an utterance section".

Note that while in the above-described embodiment, a certain amount of an acoustic signal (corresponding to T frames) is collectively processed, this processing may be implemented every time information regarding a new frame is obtained in chronological order. For example, if "$s_{T+1}$=speech", a label of "within an utterance section" can be automatically provided to $u_{T+1}$ at a timing at which $s_{T+1}$ is obtained. If "$s_{T+1}$=non-speech", and if there is a threshold for a duration of a non-speech section calculated immediately after the immediately preceding speech section, whether or not the section is an utterance section can be determined in accordance with an elapsed time period which is obtained from the immediately preceding speech section.

<Effects>

According to the utterance section detection device 11 of Embodiment 1, it is possible to robustly cut out an utterance section from an input acoustic signal. According to the utterance section detection device 11 of Embodiment 1, even in a case where a huge variety of speech phenomena are included in an acoustic signal as in spoken language, it is possible to detect an utterance section without an utterance section being interrupted in the middle of utterance or without excess non-speech sections being excessively included in an utterance section.

<Additional information>

The device of the present invention includes an input unit to which a keyboard, or the like, can be connected, an output unit to which a liquid crystal display, or the like, can be connected, a communication unit to which a communication device (for example, a communication cable) which can perform communication with outside of hardware entity can be connected, a CPU (Central Processing Unit, which may include a cache memory, a register, or the like), a RAM and a ROM which are memories, an external storage device which is a hard disk, and a bus which connects these input unit, output unit, communication unit, CPU, RAM, ROM, and external storage device so as to be able to exchange data among them, for example, as single hardware entity. Further, as necessary, it is also possible to provide a device (drive), or the like, which can perform read/write to/from a recording medium such as a CD-ROM, at the hardware entity. Examples of physical entity including such hardware resources can include a general-purpose computer.

At the external storage device of the hardware entity, a program which is necessary for implementing the above-described functions and data, or the like, which are necessary for processing of this program are stored (The device is not limited to the external storage device, and, a program may be stored in, for example, a ROM which is a read-only storage device). Further, data, or the like, obtained through processing of these programs are stored in a RAM, an external storage device, or the like, as appropriate.

At the hardware entity, each program stored in the external storage device (or the ROM, or the like), and data necessary for processing of each program are read to a memory as necessary, and interpretive execution and processing are performed at the CPU as appropriate. As a result, the CPU implements predetermined functions (respective components indicated above as parts, means, or the like).

The present invention is not limited to the above-described embodiment and can be changed as appropriate within the scope not deviating from the gist of the present invention. Further, the processing described in the above-described embodiment may be executed parallelly or individually in accordance with processing performance of devices which execute processing or as necessary as well as being executed in chronological order in accordance with description order.

As described above, in a case where the processing functions at the hardware entity (the device of the present invention) described in the above-described embodiment are implemented with a computer, processing content of the functions which should be provided at the hardware entity is described with a program. Then, by this program being executed by the computer, the processing functions at the hardware entity are implemented on the computer.

Figure 4:
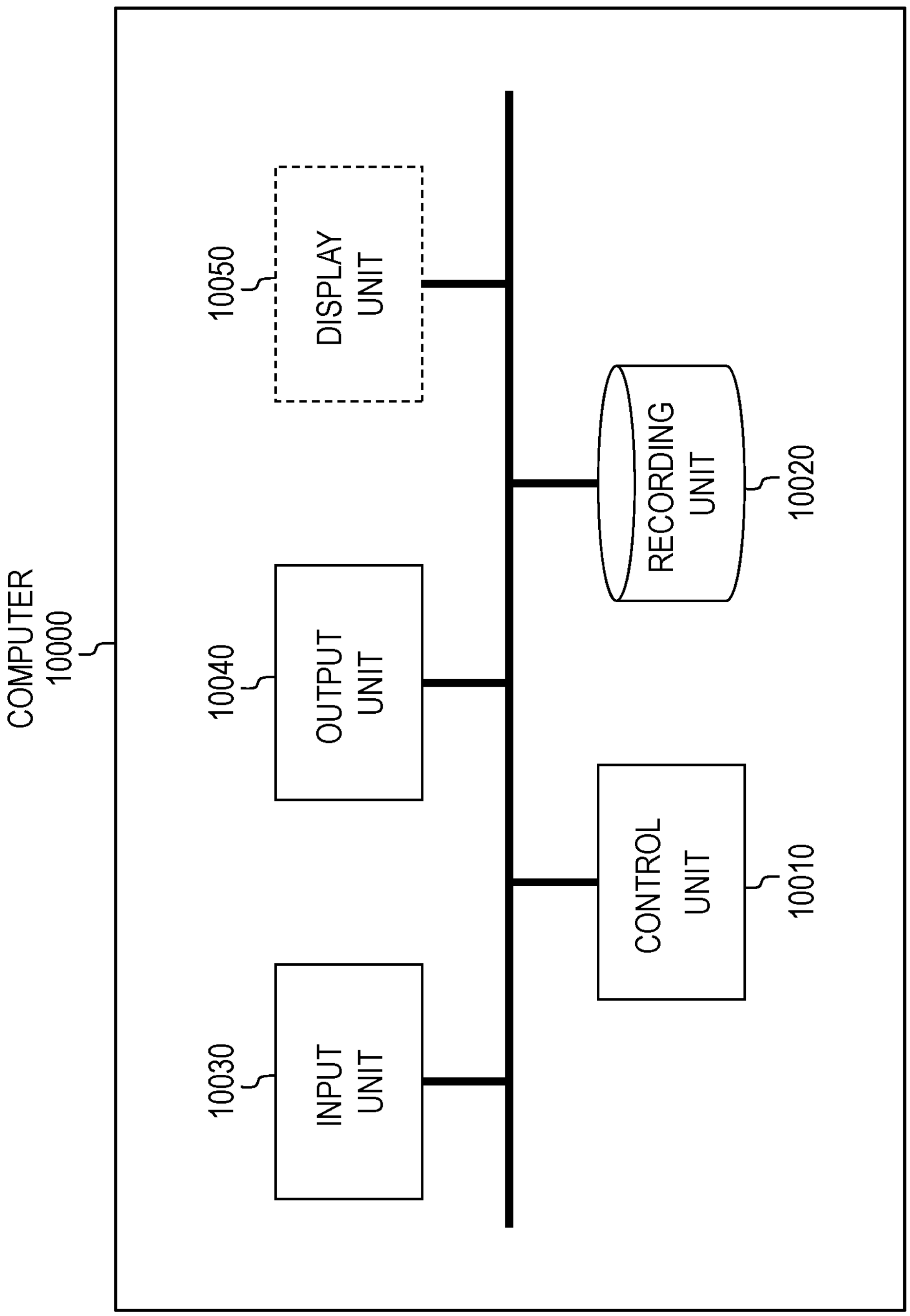
FIG. 4 is a view illustrating a functional configuration example of a computer.

The above-described various kinds of processing can be implemented by a program for executing each step of the above-described method being loaded in a recording unit 10020 of the computer illustrated in FIG. 4 and causing a control unit 10010, an input unit 10030 and an output unit 10040 to operate.

The program describing this processing content can be recorded in a computer-readable recording medium. As the computer-readable recording medium, for example, any medium such as a magnetic recording device, an optical disk, a magnetooptical recording medium and a semiconductor memory may be used. Specifically, for example, it is possible to use a hard disk device, a flexible disk, a magnetic tape, or the like, as the magnetic recording device, and use a DVD (Digital Versatile Disc), a DVD-RAM (Random Access Memory), a CD-ROM (Compact Disc Read Only Memory), a CD-R (Recordable)/RW (ReWritable), or the like, as the optical disk, use an MO (Magneto-Optical disc), or the like, as the magnetooptical recording medium, and use an EEP-ROM (Electrically Erasable and Programmable-Read Only Memory), or the like, as the semiconductor memory.

Further, this program is distributed by, for example, a portable recording medium such as a DVD and a CD-ROM in which the program is recorded being sold, given, lent, or the like. Still further, it is also possible to employ a configuration where this program is distributed by the program being stored in a storage device of a server computer and transferred from the server computer to other computers via a network.

A computer that executes such a program, for example, firstly stores temporarily the program recorded in a portable recording medium or the program transferred from a server computer in its own storage device. At the time of processing, then this computer reads the program stored in its own storage device and execute the processing in accordance with the program read. Further, as another execution form of this program, the computer may directly read a program from the portable recording medium and execute the processing in accordance with the program, and, further, sequentially execute the processing in accordance with the received program every time the program is transferred from the server computer to this computer. Further, it is also possible to employ a configuration where the above-described processing is executed by so-called ASP (Application Service Provider) type service which implements processing functions only by an instruction of execution and acquisition of a result without the program being transferred from the server computer to this computer. Note that, it is assumed that the program in this form includes information which is to be used for processing by an electronic computer, and which is equivalent to a program (not a direct command to the computer, but data, or the like, having property specifying processing of the computer).

Further, while, in this form, the hardware entity is constituted by a predetermined program being executed on the computer, at least part of the processing content may be implemented with hardware.

The invention claimed is:

1. An utterance section detection device comprising:
processing circuitry configured to:
obtain a sequence of acoustic feature amounts for each short time frame of an acoustic signal and perform speech/non-speech determination which is determination as to whether each of the short time frame of the acoustic signal is speech or non-speech and generate a speech/non-speech label sequence for the acoustic signal;
obtain a sequence of acoustic feature amounts of a certain section determined as corresponding to speech frames as a result of the speech/non-speech determination and perform utterance end determination which is determination as to whether or not an end of the certain section is an end of utterance and generate a probability of an end of the certain section being an end of utterance;
based on the probability of the end of the certain section being the end of utterance, determine a threshold for a duration immediately after the certain section of a non-speech section on a basis of a result of the utterance end determination and generate a threshold for a duration of a non-speech section immediately after the certain section;
obtain the speech/non-speech label sequence, the threshold for a duration of a non-speech section immediately after the certain section and detect an utterance section by comparing the duration of a non-speech section immediately after the certain section with the corresponding threshold and generate an utterance section label sequence; and
determine the non-speech section immediately after the certain section as a non-speech section within an utterance section in case where the duration of the non-speech section is less than the corresponding threshold, and determine the non-speech section immediately after the certain section as a non-speech section outside an utterance section in case where the duration of the non-speech section is equal to or greater than the corresponding threshold.

2. The utterance section detection device according to claim 1,
the processing circuitry configured to perform the speech/non-speech determination is further configured to
make the corresponding threshold smaller as a probability of an end of the speech section being an end of utterance becomes higher and makes the corresponding threshold greater as a probability of an end of the speech section being an end of utterance becomes lower, and
detect a non-speech section corresponding to a case where a duration of a non-speech section following the speech section is equal to or greater than the corresponding threshold, as a non-speech section outside an utterance section.

3. A non-transitory computer readable medium storing a computer program for causing a computer to function as the utterance section detection device according to claim 2.

4. A non-transitory computer readable medium storing a computer program for causing a computer to function as the utterance section detection device according to claim 1.

5. The utterance section detection device according to claim 1,
K and k are hyperparameters predetermined by a human in advance, and K≥k≥0.0, the probability is $p_{n,m}$, and the threshold $\sigma_{n,m}$ for the duration of the non-speech section is decide as:

$$\sigma_{nm}=K-kp_{n,m}.$$

6. The utterance section detection device according to claim 1,
processing circuitry configured to
obtain the probability using a neural network that has been trained using learning data based on acoustic features.

7. An utterance section detection method comprising:
obtaining a sequence of acoustic feature amounts for each short time frame of an acoustic signal and performing speech/non-speech determination which is determination as to whether each of the short time frame of the acoustic signal is speech or non-speech and generating a speech/non-speech label sequence for the acoustic signal;

obtaining a sequence of acoustic feature amounts of a certain section determined as corresponding to speech frames as a result of the speech/non-speech determination and performing an utterance end determination which is determination as to whether or not an end of a certain section is an end of utterance and generating a probability of an end of the certain section being an end of utterance;

based on the probability of the end of the certain section being the end of utterance, determining a threshold for a duration immediately after the certain section of a non-speech section on a basis of a result of the utterance end determination and generating the threshold for a duration of a non-speech section immediately after the certain section;

obtaining the speech/non-speech label sequence, the threshold for a duration of a non-speech section immediately after the certain section and detecting an utterance section by comparing a duration of a non-speech section immediately after the certain section with the corresponding threshold and generating an utterance section label sequence; and determining the non-speech section immediately after the certain section as a non-speech section within an utterance section in case where the duration of the non-speech section is less than the corresponding threshold, and determining the non-speech section immediately after the certain section as a non-speech section outside an utterance section in case where the duration of the non-speech section is equal to or greater than the corresponding threshold.

8. The utterance section detection method according to claim 7, wherein, in the non-speech section duration threshold determination step of the speech/non-speech determination step, the corresponding threshold is made smaller as a probability of an end of the speech section being an end of utterance becomes higher, and the corresponding threshold is made greater as a probability of an end of the speech section being an end of utterance becomes lower, and in the utterance section detection step, a non-speech section corresponding to a case where a duration of a non-speech section following the speech section is equal to or greater than the corresponding threshold is detected as a non-speech section outside an utterance section.

* * * * *